(No Model.)
J. HAMPSON.
DEAD CENTER DEVICE FOR LATHES.
No. 316,541. Patented Apr. 28, 1885.
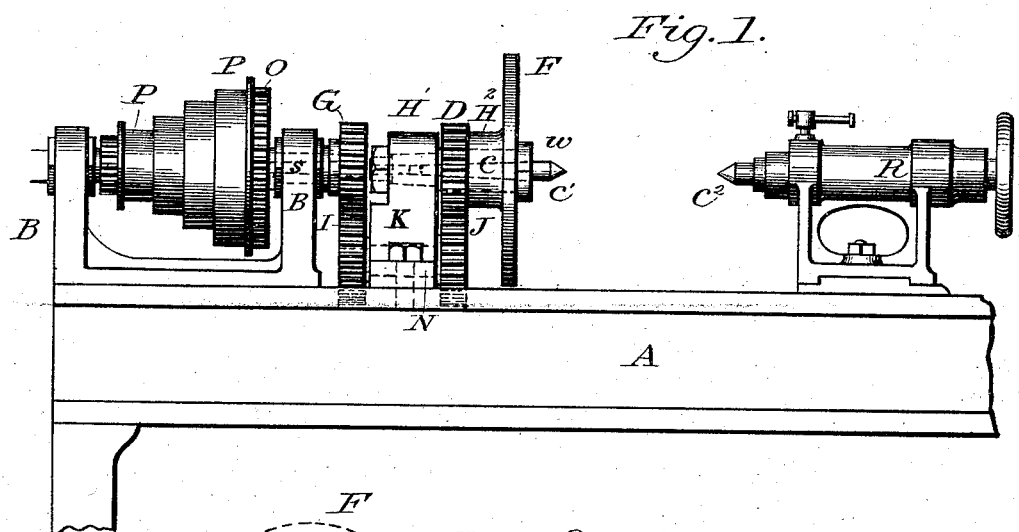
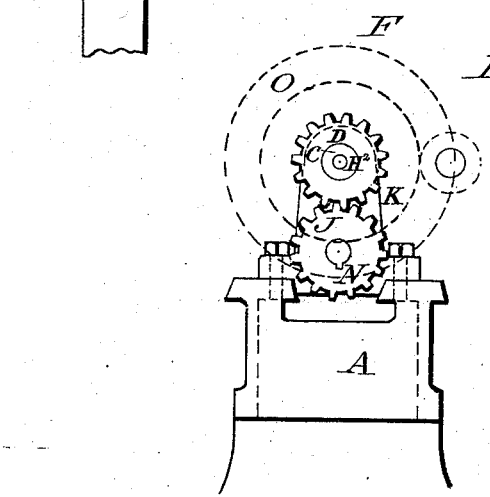
WITNESSES:
INVENTOR:
Joseph Hampson

United States Patent Office.

JOSEPH HAMPSON, OF NEWBURG, NEW YORK.

DEAD-CENTER DEVICE FOR LATHES.

SPECIFICATION forming part of Letters Patent No. 316,541, dated April 28, 1885.

Application filed September 6, 1884. (No model.)

*To all whom it may concern:*

Be it known that I, JOSEPH HAMPSON, a citizen of the United States, residing at Newburg, in the county of Orange and State of New York, have invented a new and useful Improvement in Turning-Lathes, of which the following is a specification.

My invention relates to an attachment to any lathe for turning wood or metals by which it can be changed from a live-center or revolving-center lathe to a dead-center lathe. On a live-center lathe the center at the head-stock revolves with the spindle, which frequently does not run true; and when a piece of iron, for instance, has been turned at one end and it is reversed to be turned at the other end, it is often found that it does not run perfectly central with the other end. On a dead-center lathe this is impossible. Both centers on which the iron is revolving are standing still, and the piece to be turned may be reversed, but it always must run true on the centers. Any accurate work should be turned on a dead-center lathe. I accomplish this improvement by the mechanism illustrated in the accompanying drawings, in which—

Figure 1 represents a side view of a lathe-bed with head and tail stock and with the mechanical attachment. Fig. 2 is an end view of the lathe-bed and a front view of the attachment to the lathe.

A A represent the lathe-bed; B B, the head-stock; S, the spindle; P P, the pulleys of the cone; O, the large spur-wheel on the spindle, as commonly used on any lathe.

Instead of placing a face-plate on the end of the spindle S, a spur-wheel, G, takes its place, which gears into another wheel, I, of the same size, situated below the gear G. A standard, K, which stands on and is fitted to the bed of the lathe, carries a shaft, N, on which the spur-wheel I at one end and another similar wheel, J, at the other end are fastened. The stand K carries also a strong stud, H', which is placed perfectly in line with the center of spindle S and the center of tail-stock R. This stud H' is fitted conically in its place and is held by a nut at the small end. The large part of the stud H' projects forward with a cylindrical pin, $H^2$, which forms a bearing for another spur-wheel, D, similar to the gears G, I, and J, but which is fastened to a face-plate, F, and revolves with the same on the pin $H^2$. The shoulder $w$ on the front end of the pin $H^2$ keeps the gear D and face-plate F in place. The stud H' is stationary, and into it is fitted conically the center $c$, with the point $c'$, which is in line with the center $c^2$ in the tail-stock. If the lathe is set in motion, the face-plate F revolves in the same way as if it were fastened to the spindle S, in place of the spur-wheel G. The face-plate F has slots or holes for bolts or driving-pins, or to receive the shank of the lathe-dog to turn the piece on the centers. Both centers $c'$ $c^2$ are stationary now, and anything turned on the centers must run perfectly true when reversed on the centers. The standard K, which is only bolted to the lathe-bed, can be removed, with the gears, and if a face-plate is put on the spindle S in place of the gear G and a center inserted in the spindle S the lathe is reduced again to a live-center lathe, and by replacing the stand and gears the lathe is remodeled to a dead-center lathe.

What I claim as my invention, and desire to secure by Letters Patent, is—

The standard K, with shaft N, carrying the two gears I and J, and with stud H', carrying the gear D, with face-plate F and center $c$, in combination with the spur-gear G on the spindle S, and with the center $c^2$ on the tail-stock R on a lathe, to transform a common lathe into a dead-center lathe, substantially as specified.

JOSEPH HAMPSON.

Witnesses:
 G. MÜLLER,
 J. W. GERECKE.